(12) United States Patent
Bozic (10) Patent No.: US 11,402,359 B2
(45) Date of Patent: Aug. 2, 2022

(54) METHOD FOR OPERATING A FRACTIONATION COLLECTOR DURING CHROMATOGRAPHY

(71) Applicant: Alexander Bozic, Oberursel (DE)

(72) Inventor: Alexander Bozic, Oberursel (DE)

( * ) Notice: Subject to any disclaimer, the term of this patent is extended or adjusted under 35 U.S.C. 154(b) by 342 days.

(21) Appl. No.: 16/644,184

(22) PCT Filed: Sep. 3, 2018

(86) PCT No.: PCT/EP2018/073593
§ 371 (c)(1),
(2) Date: May 15, 2020

(87) PCT Pub. No.: WO2019/048369
PCT Pub. Date: Mar. 14, 2019

(65) Prior Publication Data
US 2020/0284769 A1    Sep. 10, 2020

(30) Foreign Application Priority Data
Sep. 5, 2017 (DE) .......................... 102017120421.0

(51) Int. Cl.
*G01N 30/82* (2006.01)
*B01D 15/40* (2006.01)
(Continued)

(52) U.S. Cl.
CPC .............. *G01N 30/82* (2013.01); *B01D 15/40* (2013.01); *G01N 30/34* (2013.01); *G01N 30/36* (2013.01); *G01N 2030/027* (2013.01)

(58) Field of Classification Search
CPC ...... B01D 15/247; B01D 15/40; G01N 30/34; G01N 30/36; G01N 30/82; G01N 2030/027
See application file for complete search history.

(56) References Cited

U.S. PATENT DOCUMENTS 8,877,051 B2 * 11/2014 Fogelman .............. G01N 30/82
  210/198.2
10,175,209 B2   1/2019 Burnett et al.
(Continued)

FOREIGN PATENT DOCUMENTS

DE      102015118766 A1    5/2016
EP          1348956 A2    10/2003
(Continued)

OTHER PUBLICATIONS

Search Report in International Application No. PCT/EP2018/073593 dated Jan. 8, 2019, 5 pages.

*Primary Examiner* — Justin N Olamit
(74) *Attorney, Agent, or Firm* — Marshall, Gerstein & Borun LLP (57) ABSTRACT

The present invention describes a method of operating a fractionation collector in chromatography, and a chromatograph system for carrying out the method, wherein a solvent composition is pumped into a chromatography column, which contains at least a portion of a first solvent that is liquid under normal conditions and contains a portion of a second solvent that is gaseous at normal conditions, and the composition flowing out of the chromatography column is at least partially introduced into a detector, wherein a composition containing the first solvent, after leaving the chromatography column, is introduced into a collection vessel of the fraction collector in dependence of the detector signal, and the amount of liquid that is introduced into a collecting vessel of the fraction collector is selected in dependence of the portion of said first solvent.

22 Claims, 3 Drawing Sheets

(51) Int. Cl.
    *G01N 30/34*     (2006.01)
    *G01N 30/36*     (2006.01)
    *G01N 30/02*     (2006.01)

(56) References Cited

U.S. PATENT DOCUMENTS

| | | | |
|---|---|---|---|
| 10,473,633 B2* | 11/2019 | Okoba | B01D 15/247 |
| 10,620,172 B2* | 4/2020 | Nyholm | B01D 15/247 |
| 2005/0277199 A1* | 12/2005 | Isbell | G01N 27/44717 |
| | | | 702/22 |

FOREIGN PATENT DOCUMENTS

| | | |
|---|---|---|
| WO | WO-2014/012962 A1 | 1/2014 |
| WO | WO-2016/122633 A1 | 8/2016 |

* cited by examiner

METHOD FOR OPERATING A FRACTIONATION COLLECTOR DURING CHROMATOGRAPHY

BACKGROUND OF THE INVENTION

Field of the Invention

The present invention relates to a method of operating a fractionation collector in chromatography and a chromatography system for carrying out said method.

Related Technology

Many advantages can be achieved via Supercritical Fluid Chromatography (SFC), such that different substances can be divided, chemically analyzed, identified and quantified easily and reliably. When using carbon dioxide ($CO_2$) as a liquid in SFC applications, the extraction of the substances is generally performed above the critical temperature of 31° C. and above a critical pressure of 74 bar.

In order to keep $CO_2$ or a $CO_2$ mixture in a liquid state within a chromatography column, the entire chromatography system must be kept at a predetermined pressure level. To this end, a back-pressure regulator is typically provided downstream of the chromatography column and downstream of each detector in order to keep the pressure within the chromatography system at a specified level.

In practical applications, SFC technology has the disadvantage that the mobile phase of the chromatographically divided substances cannot simply be collected in open vessels. As soon as a mixture of liquid $CO_2$ and an additional solvent is exposed to atmospheric pressure, the $CO_2$ expands and forms an aerosol with the additional solvent.

In an SFC, however, the composition of the aerosol can vary greatly, because a solvent gradient is often used to divide substances. The mixture of $CO_2$ and an additional solvent such as methanol can, for example, vary from 10% to 60% methanol fraction. As a result, the constitution of the aerosol and its volume flow may vary accordingly, resulting in suboptimal division rates of gaseous and liquid aerosol fractions in a cyclone separator.

Other gas-liquid division systems use, for example, impact separation, wherein the aerosol volume flow is directed to a baffle plate which may optionally be provided by a test tube. In general, impact separators and inertial separators require a comparatively large volume into which the aerosol can expand. Such comparatively large vessels are not optimal with regard to self-cleaning effects, since cross-contamination of aerosols and substances that are processed successively by such separators can occur. In particular, the differences in transit times of the substances must be very large in order to ensure sufficient division. In principle, the size and surface of the impact separator can be minimized when operating at elevated pressure levels.

For example, a test tube serving as a deflecting plate may be provided in a pressurized environment. The aerosol can then escape through a curved outlet and impinge the side wall of the test tube at a predetermined angle. With such an impact separator, it is indeed possible to collect smaller quantities of a substance with much less effort. However, impact separators operating at an elevated pressure level do not allow for large scale automated fractionation.

The operating costs and installation costs are therefore comparatively high, since only a limited number of test tubes can be automatically processed in the pressure region. In addition, the division speed is not as good as that of separators operating at atmospheric pressure.

If gas-liquid separators are used, as described, for example, in WO 2014/012962 A1, this problem can be solved. However, the segregation of large amounts of gas leads to a change in the volume flow originally introduced into the chromatography column. This may cause problems with fraction collection. For example, the publication by Rui Chen, "Mass-Directed Preparative SFC with Open-Bed Fraction Collection", Waters Corporation, May 2010, 72000346en describes that the signal integrity could thus be impaired. As a solution to this problem, it is proposed to add the appropriate amount of a solvent that is liquid at room temperature before expansion by means of a pump in order to keep the volume flow constant.

However, this solution is very complex and error-prone. Further, it should be noted that each change of a collecting vessel during the collection of a fraction leads to a relatively high loss. The switchover or changeover time is approx. 1 second, during which a volume to be collected is directed into a waste container. With a flow rate of 150 ml/min, for example, there is a loss of 2.5 ml. This problem could be alleviated by using larger collecting containers. However, these are also disadvantageous because they require a larger area. Further, the losses due to buildup on the surface area of the vessel are relatively high for small volumes. However, repeated rinsing of the collecting vessels requires the processing of unnecessarily diluted compositions.

SUMMARY

In view of the prior art, it is therefore an object of the present invention to provide a method of operating a fractionation collector in chromatography that solves the problems set out above. Here, the method should be as simple and inexpensive to carry out as possible and lead to further cost and manageability advantages. For example, the signal integrity should be achieved without the addition of solvent. Further, the degree of filling of the collecting containers should be as high as possible, even when the partial volume flow of a solvent that is liquid under normal conditions changes.

Further, it is also an object of this invention to provide a method of operating a fractionation collector, in which the highest possible yield of the purified substances can be achieved. Here, this high yield should be achievable for possibly different gas-liquid mixtures.

Another object is to provide a chromatography system for carrying out a method that can be operated and manufactured particularly cost-effectively and with little maintenance. Further, it is an object of the present invention to provide components enabling a known HPLC system to be converted into an SFC system as easily as possible. Here, a conversion of preparative HPLC systems should also be made possible.

These as well as further objects that are not explicitly mentioned, but that can easily be derived or inferred from the relationships discussed at the outset, are solved by a method of operating a fractionation collector in chromatography with all the features of patent claim 1.

The present invention accordingly relates to a method of operating a fractionation collector in chromatography, wherein a solvent composition is pumped into a chromatography column that contains at least a portion of a first solvent that is liquid under normal conditions and a portion of a second solvent that is gaseous under normal conditions, and the composition flowing out of the chromatography column is at least partially introduced into a detector, which is characterized in that a composition containing said first solvent, after leaving the chromatography column, is introduced into a collecting vessel of the fraction collector in dependence of the detector signal, and the amount of liquid that is introduced into a collecting vessel of said fraction collector is selected in dependence of the portion of said first solvent.

The present invention in particular has the effect that the economy is improved, it being possible in particular to achieve a high degree of filling of the collecting vessels of the fraction collector. Further, the signal integrity can be maintained without the need to add solvent.

Furthermore, the method of operating a fractionation collector can be carried out very inexpensively and easily. In addition, a very high yield of the purified substances is achieved. Here, this high yield is achieved for very many different gas-liquid mixtures.

Further, very good results are also achieved with chromatography methods, in which gas-liquid compositions with a gradient are used. In addition, the method can also be carried out with very different volume flows of the aerosol without the economic advantages being severely impaired.

Automated fractionation is also possible and can be scaled according to requirements without the need for large investments.

Further, the present method and the chromatography system for carrying out a method can reduce complexity and cost of technical equipment required for setting up the SFC analysis. Here, HPLC systems that are intended for preparative use can also be converted.

In a chromatography method according to the invention, a solvent composition is pumped into a chromatography column that contains at least a portion of a first solvent that is liquid under normal conditions and a portion of a second solvent that is gaseous under normal conditions. It therefore preferably involves an SFC as described earlier and below. Normal conditions mean 273.15 K=0° C. and 1.01325 bar according to DIN 1343.

To carry out a segregation involving a supercritical fluid, an inorganic or organic solvent is used that is liquid under the usual segregation conditions, preferably at 25° C. and atmospheric pressure (1023 mbar). Here, a polar or non-polar solvent can be used, depending on the type of compounds to be separated or purified. These substances are referred to here in particular as the first solvent.

Preferably, the first solvent is selected from alcohol, preferably methanol, ethanol or propanol, hexane, mixtures with dichloromethane, chloroform, water (preferably up to a maximum of 3% by volume, since otherwise a miscibility gap can occur), an aldehyde or a ketone, preferably methyl ethyl ketone; an ester, preferably ethyl acetate; or an ether, preferably tetrahydrofuran, an aliphatic hydrocarbon, preferably hexane, cyclohexane, heptane, octane; an aromatic hydrocarbon, preferably benzene, toluene, xylene. These compounds can be used individually or as a mixture.

Further, it can be provided that in a method according to the invention a gas is preferably used which can be brought into a supercritical state relatively easily. The preferred gases that have these properties include, inter alia, carbon dioxide ($CO_2$), ammonia ($NH_3$), Freon, xenon, wherein carbon dioxide ($CO_2$) is particularly preferred. These substances are referred to here in particular as the second solvent.

Preferably, it can be provided that the gas-liquid mixture to be brought into the supercritical state comprises a polar solvent and a gas that is selected from the group consisting of $CO_2$, $NH_3$, Freon, xenon, preferably $CO_2$. Preferably, the polar solvent is an alcohol, preferably methanol, ethanol or propanol, hexane, mixtures with dichloromethane, chloroform, water (preferably up to a maximum of 3% by volume, since otherwise a miscibility gap can occur), an aldehyde or a ketone, preferably methyl ethyl ketone; an ester, preferably ethyl acetate; or an ether, preferably tetrahydrofuran.

Further, it can be provided that the gas-liquid mixture to be brought into the supercritical state comprises a non-polar solvent and a gas that is selected from the group consisting of $CO_2$, $NH_3$, Freon, xenon, preferably $CO_2$. Preferably, the non-polar solvent is an aliphatic hydrocarbon, preferably hexane, cyclohexane, heptane, octane; an aromatic hydrocarbon, preferably benzene, toluene, xylene; an ester, preferably ethyl acetate; or an ether, preferably tetrahydrofuran.

According to the present method, the composition flowing out of the chromatography column is at least partially introduced into a detector. Accordingly, a verification of the corresponding composition is preferably performed downstream of the chromatography column. Detectors that can be used for this are generally known, wherein in particular spectroscopy methods in which electromagnetic waves are used, such as UV and VIS spectroscopy, are carried out. Here, further detection methods can also be used that measure, for example, light scattering, fluorescence or the refractive index. Further, mass spectrometers and/or conductivity detectors etc. are frequently used.

These methods can measure continuously or in batches the properties of the composition flowing out of the chromatography column, so that these detectors can determine these properties in flow or by sampling, wherein the latter occurs generally fully automatic and continuously. Details of these techniques are known from the prior art, for which reference is made in particular to detectors as are used in conventional HPLC methods.

According to the invention, a composition containing the first solvent, after leaving the chromatography column, is introduced into a collecting vessel of the fraction collector in dependence of the detector signal, and the amount of liquid that is introduced into a collecting vessel of said fraction collector is selected in dependence of the portion of said first solvent.

Through this measure, it can be achieved in particular that the volume of a collecting vessel of the fraction collector can be utilized in a surprisingly good manner. In this manner, in particular the cost and handling advantages set out beforehand can be achieved.

Further cost and handling advantages can be achieved in that at least a part of the composition that contains the first solvent is not introduced into a collecting vessel after leaving the chromatography column. Compositions that do not contain valuable substances are preferably discarded, wherein this is generally effectuated by a control valve in the fraction collector that directs the portions of the composition containing the first solvent to be discarded after leaving the chromatography column into a waste container or the like.

In a special configuration, it can be provided that the solvent composition pumped into a chromatography column is changed in the course of the chromatography.

Preferably, the portion of the first solvent in the solvent composition is increased in the course of the chromatography and the portion of the second solvent is reduced in the course of the chromatography, the portion of the first solvent at the beginning of the chromatography being particularly preferred at least 10% by volume, especially preferred at least 20% by volume, below the portion of the first solvent at the end of the chromatography, based on the solvent composition. Accordingly, the portion of the solvent that is liquid under normal conditions preferably increases, while the portion of the solvent that is gaseous under normal conditions decreases. Through this configuration, incrustation in a gas separator that is used in a preferred configuration of the method, can be surprisingly minimized, preferably completely prevented. By this means, the segregation quality of the system or of the method can be surprisingly improved.

Further, it can be provided that the portion of the first solvent lies in the range from 5 to 95% by volume and the portion of the second solvent lies in the range from 5 to 95% by volume, based on the solvent composition.

Preferably, it can be provided that the chromatography is carried out at a pressure in the range from 50 to 500 bar, preferably 75 to 400 bar.

In a preferred embodiment, it can be provided that the chromatography is carried out at a temperature in the range from 20° C. to 80° C., preferably 35° C. to 60° C.

In a preferred embodiment, it can be provided that the second solvent that is contained in the composition downstream of the chromatography column is at least partially separated off before the composition is introduced into the fraction collector. Hereby, a significant improvement in economy can surprisingly be achieved, since part of the solvent is separated off upstream of the fraction collector and, as a result, it is less often necessary to change the collecting vessels with the same volume of the collecting vessels.

Accordingly, it can be provided that a gas-liquid separator is used, wherein the pressure in the gas-liquid separator preferably lies in the range from 0.1 to 4 bar, preferably 0.5 to 3.5 bar and particularly preferred 1 to 3 bar (excess pressure). Through this configuration, further surprising improvements can be achieved. In particular, the transit time between the expansion of the solvent mixture and the outlet of the gas-liquid separator is essentially determined by the pressure drop. The gas generated in a small volume causes a high pressure, which is decisive for the transit time. The relative constancy of this pressure leads to a high signal integrity, since the transit time remains essentially constant even after expansion when using a suitable gas-liquid separator. Accordingly, in particular when using a gas-liquid separator that can be operated preferably at an excess pressure, it is possible to dispense with an addition of solvents, as has been used according to the prior art, in order to ensure signal integrity. Here, it is to be noted that an absolute constancy of the gas pressure in the gas-liquid separator is not necessary, since the transit time is very short even at relatively low pressures, so that fluctuations have no significant effect on the signal integrity, as this is subject to normal fluctuation due to error tolerances. As such, pressure fluctuations in the range of 0.1 bar to 4 bar in the gas-liquid separator lead to expedient results. Preferred embodiments of suitable gas-liquid separators are described later, wherein reference is made to this fact.

In a preferred embodiment of the method, in which the chromatography system comprises a backpressure regulator, by means of which the pressure in the gas-liquid separator is controllable, it can be provided that the regulation of the pressure is selected in dependence of the solvent content of the gas-liquid mixture, the regulation can preferably be configured such that a high pressure is provided in the gas-liquid separator when the solvent content is high.

Preferably, it can be provided that the fractionation is operated at a lower pressure than the gas-liquid separator, wherein preferably the pressure difference lies in the range from 0.1 to 4, preferably 0.5 to 3.5 bar and particularly preferred 1 to 3 bar.

The fractionation is preferably carried out at a pressure in the range from 0 to 1 bar (excess pressure), particularly preferred 0 to 0.5 bar, especially preferred 0 to 0.2 bar. The pressure values set out above relate to excess pressure, this pressure being measured relative to atmospheric pressure or air pressure.

The detection of a fraction to be collected can be determined in the usual manner that is generally also used in related chromatography methods. This includes, for example, that a fraction is collected at a certain signal level of the detector, for example a UV/VIS detector. Further, a fraction can also be collected on the basis of a certain shape of the signal, for example the predetermined change in the slope of the detector signal or a certain value of the slope of the detector signal.

Preferably, it can be provided that, when determining the time of the beginning of the collection for the introduction of the fractions to be collected, the liquid volume of the lines and apparatus is to be taken into account between the detector up to the segregation point at which the fractions to be collected are separated from the fractions to be discarded. This time span, which causes the system to be calibrated and thus enables valuable fractions to be optimally collected, can be carried out using methods known per se. For example, a test run can be carried out, on the basis of which the time span can be estimated. In a preferred configuration, for example, a dye can be used that is visible on the fraction collector. The time span between the detector signal, for example a UV/VIS signal, and the appearance of the colored fraction on the fraction collector, results in this time span. In principle, this time span can of course also be determined by way of the measured volume and the set volume flow (flow rate). These methods are known from the prior art, since this problem exists and is solved in every HPLC system with an automatic fractionation.

In a preferred embodiment it can be provided that the portion of the first solvent in the solvent composition is determined via the time of the beginning of the fraction collection, wherein preferably said solvent composition provided over the course of time is input in a control unit and said portion of first solvent is determined based on the start time of collection, and the collection time for a collecting vessel is determined based on this portion as well as on the flow rate, wherein said volume of the collecting vessel is stored in the control unit.

Accordingly, the partial volume of the first solvent at the time of detection is preferably determined, wherein this value, for example, can be obtained from the pump power of the pump with which the first solvent is conveyed into the chromatography column, the gradient course of this pump power and the time of the detection. From these values, the partial volume of the first solvent at the time of detection can be determined, which can preferably be used to determine the appropriate utilization of the volume of the collecting vessel. The actual collection of the detected fraction is preferably carried out taking into account the time span that the liquid to be collected needs to cover the distance between the detector signal and the fraction collection valve.

Further, it can be provided that the degree of filling of the collecting vessel takes place via a summation of the volume that is introduced into said collecting vessel over a period of time, wherein the individual volume components of the sum formation is determined using the products of the flow rate, the period of time over which the volume component is collected and the portion of the first solvent in the solvent composition at the start time of the respective volume component, wherein the volume of the collecting vessel is stored in the control unit.

This relationship can be represented, for example, using the following formula (I):

$$\sum_{t=t_s}^{t_n} (F_G * \varphi_{(t)}) \Delta t = V_{max} \quad \text{Formula (I)}$$

wherein:
$F_G$ is the total volume flow
$\varphi_{(t)}$ is the volume fraction of the first solvent at time t
$\Delta t$ is the period of time over which the volume of a single volume component is calculated
$V_{max}$ is the maximum volume of the collecting vessel
$t_s$ is the start time at which the detector signal indicates a fraction to be collected
$t_n$ is the end time up to which a fraction to be collected can be introduced into a collecting vessel Accordingly, the total volume is continuously calculated from the sum of the individual volume components and, at the time ($t_n$) at which this total volume is equal to the maximum volume of the collecting vessel, a signal is sent to the fraction collector to perform a change of the collecting vessel. Here, the maximum volume of the collecting vessel ($V_{max}$) is selected such that overflow of the collecting vessel can be avoided.

Furthermore, it can be provided that the amount of liquid introduced into a collecting vessel is at least 70%, preferably at least 90%, of the maximum volume for the collecting volume of the collecting vessel if the detection unit does not detect a new fraction. Hereby, a very good utilization of the volume of the collecting vessel provided can be achieved. Upon detection of a new fraction, the collecting vessel is generally changed.

Preferably, it can be provided that the period of time over which the volume of an individual volume component is calculated lies in the range from 0.01 to 10.0 s, preferably 0.1 to 5.0 s and particularly preferred from 0.5 to 2.0 s.

Further, it can be provided that the chromatography is carried out at a flow rate in the range from 10 ml/min to 450 ml/min, particularly preferred in the range from 50 ml/min to 300 ml/min and especially preferred 100 ml/min to 250 ml/min. This flow rate represents the total flow rate. The flow rate of the individual solvents, in particular the first or the second solvent that are each used as a mixture, results from the respective volume fraction.

In a preferred embodiment, the detector comprises a mass spectrometer and the time required for determining the mass spectrometry signal is taken into account in the control unit of the fraction collector. Preferably, when using a mass spectrometer, an additional volume can be provided that is disposed between the mass spectrometer and the fraction collector, so that the flow time of the fraction to be collected is long enough to enable reliable detection.

Further, it can be provided that the fraction collector is controlled by means of a control unit and the control unit is operatively connected to the detector, wherein when a substance is detected by the detector, a control signal is sent to the fraction collector, which causes a change of the collecting vessel.

In a further embodiment, it can be provided that the fraction collector is controlled by means of a control unit and the control unit is operatively connected to the detector, wherein after the detection of a substance by the detector has ended a control signal is sent to the fraction collector, which causes a change of the collecting vessel. This configuration is preferred over the embodiment in which a change of the collecting vessel is effectuated at the beginning.

A further object of the present invention is a chromatography system for performing a method, wherein the chromatography system comprises a controller that is operatively connected to a detector and a fraction collector and the controller is programmable so that the amount of liquid that is able to be introduced into a vessel of the fraction collector is settable in dependence of the portion of the first solvent.

In regard to preferred embodiments of a system for performing a method according to the invention, reference is made to the explanations given above that have been made in regard to the method according to the invention, in order to avoid repetitions.

A chromatography system that is designed for supercritical liquid chromatography is described by way of example using supercritical $CO_2$ together with a solvent, for example with methanol. Accordingly, a chromatography system designed for supercritical liquid chromatography has at least one storage container for the first solvent and one storage container for the supercritical fluid, for example $CO_2$. In general, the fluid is removed from the storage and transferred with at least one pump respectively into a mixing element that is in fluid communication with a chromatography column. The pumps and/or the mixing element as well as the chromatography column can be provided with a temperature control in order to be able to set a predetermined temperature respectively. For this purpose, heat exchangers in particular can be provided. The addition of mixtures to be separated, in particular substances to be purified, can be done by known devices, for example injectors that are preferably provided in the line in which the solvent is fed to the mixing element.

Preferably, it can be provided that the chromatography system comprises an injection device with which samples can be injected automatically into the chromatography system.

The fluid leaving the chromatography column is preferably at least partially introduced into a detection or analysis unit. Examples of a detection or analysis unit, inter alia, are UV detectors and/or mass spectrometers.

Downstream of the chromatography column and preferably downstream of the detection or analysis unit, a back-pressure regulator is generally provided, and preferably a heat exchanger is provided downstream of the backpressure regulator. The aerosol leaving the heat exchanger is preferably subsequently fed to a gas-liquid separator.

Preferred gas-liquid separators to be used are known from the prior art, for example the publication WO 2014/012962 A1, the disclosure of this publication being completely incorporated by reference into the present application for disclosure purposes.

An unexpected improvement of an impact separation can be achieved by disposition and configuration of a separation opening. Hereby, in particular, the gas volume provided due to the impact separation can be reduced, so that the total volume of the gas-liquid separator can be reduced. Hereby, the segregation performance of the chromatography system can be surprisingly improved.

A preferred gas-liquid separator comprises a separating region with an inlet nozzle, a baffle unit and a gas-guiding unit.

Preferably, the separating region is configured in such a way that a impact separation is effectuated. Impact separation means that the liquid droplets in the aerosol are directed against a baffle unit, and as a result thereof, the liquid droplets can form a liquid film.

Baffle unit can here be any body against which the aerosol flow can be directed. For example, the aerosol stream can be directed against an upper region of the separating region, for example against an upper end of the separating region. Here, a projection, for example a mandrel or the like, can be provided, onto which the aerosol stream impinges, so that the liquid droplets directed onto the baffle unit are not thrown back or rebound from the baffle unit, but instead form a film.

A preferred gas-liquid separator uses gravitation during operation, which effects a segregation of gas and liquid. Accordingly, the expression above refers to the orientation of the gas-liquid separator that is in operation, so that a gas can flow out upwards while the counter direction in which a liquid exits the gas-liquid separator is at the bottom thereof.

In a preferred configuration, it can be provided that the baffle unit is essentially flat and can be regarded as a baffle plate, this baffle plate preferably forming a wall of the separating region and representing a sidewall of the gas-guiding unit. The expression "essentially flat" means that the baffle unit or the baffle plate is not curved, but can have a surface structure. In a specific configuration, the baffle plate is preferably designed without a surface structure, so that this surface is smooth.

In a preferred embodiment, the baffle unit preferably comprises a surface structure, this embodiment being preferred to one with a smooth surface. Here, the surface structure preferably has elevations and depressions, wherein the elevations preferably have a height in the range from 0.2 to 10 mm, particularly preferred in the range from 0.8 to 8 mm and especially preferred in the range from 1.5 to 5 mm, with respect to the depressions.

Further, it can be provided that the ratio of the height of the elevations (in relation to the depressions) to the volume of the gas-liquid separator is preferably in the range from 0.01 to 10 mm/ml, particularly preferred in the range from 0.03 to 5 mm/ml.

In a further configuration, the surface structure of the baffle unit has grooves, wherein the elevations and depressions of the grooves are preferably oriented in the direction that is formed by the inlet nozzle and the separation opening, or run parallel to this direction.

Due to a structured surface of the baffle unit that is preferably formed as a groove structure, the volume of the gas-liquid separator can be kept particularly small, thus improving the separation performance. Here, the substances to be separated can have a relatively small difference in transit time, without their segregation in the gas-liquid separator being hindered. Further, the degree of separation of the liquid from the aerosol can be improved in relation to the volume of the gas-liquid separator.

In a further development of the present invention, the baffle unit preferably has surface region with a surface energy of at least 10 mN/m, particularly preferred at least 15 mN/m and especially preferred of at least 20 mN/m. Preferably, it can be provided that the baffle unit preferably has a surface region with a surface energy in the range from 15 to 120 mN/m, particularly preferred in the range from 20 to 80 mN/m and especially preferred in the range from 22 to 60 mN/m, wherein preferably at least 80%, particularly preferred at least 90%, of the surface of the baffle unit has a surface energy in the range from 20 to 80 mN/m, especially preferred in the range from 22 to 60 mN/m. This surface energy can be achieved by a suitable choice of material from which the baffle unit is made.

Further, the baffle unit can have a surface region with a coating in order to adjust the aforementioned surface energy, wherein preferably at least 80%, particularly preferred at least 90%, of the surface of the baffle unit has a coating.

The surface energy is determined using the Ownes-Wendt-Rabel & Kaelble method. For this purpose, series of measurements are applied using the standard Busscher series, in which as test liquids water [SFT 72.1 mN/m], formamide [SFT 56.9 mN/m, diiodomethane [SFT 50.0 mN/m] and alpha-bromonaphthalene [SFT 44.4 mN/m] are used. The measurement is taken at 20° C. The surface energy can be determined with a G40 contact angle measuring system from Krüss, Hamburg, wherein the implementation is described in the user manual for the G40 contact angle measuring system, 1993. With regard to the calculation methods, reference is made to A. W. Neumann, Über die Messmethodik zur Bestimmung grenzflächenenergetischer Größen (About the Measurement Methodology for the Determination of Surface Energy Parameters), Part I, Zeitschrift für Phys. Chem., Vol. 41, pp. 339 352 (1964), and A. W. Neumann, Über die Messmethodik zur Bestimmung grenzflächenenergetischer Größen (About the Measurement Methodology for the Determination of Surface Energy Parameters), Part II, Zeitschrift für Phys. Chem., Vol. 43, pp. 71 83 (1964).

In addition to a baffle unit, an inlet nozzle is preferably provided in the separating region of the gas-liquid separator. Through the inlet nozzle, the aerosol is introduced into the gas-liquid separator, in particular into the separating region of the gas-liquid separator.

Here, the inlet nozzle is preferably configured in such a way that a gas-liquid flow directed through the inlet nozzle is able to impinge against the baffle unit, as has already been explained with regard to the baffle unit.

The shape and type of the inlet nozzle are not critical, so that a person skilled in the art can choose them within the scope of his abilities. Thus, the inlet nozzle can be configured such that the aerosol is directed onto the baffle unit in the form of a very narrow jet. Further, the inlet nozzle can also be constructed in such a way that a conical spray mist is directed onto the baffle unit.

Here, the nozzle can end flush with the wall of the separating region or protrude into the separating region by means of a projection. The embodiment with a projection is advantageous if the baffle unit is provided in the upper end of the separating region.

Particularly preferred, the inlet nozzle is designed in the form of a simple bore or a simple opening. In a further development, it can be provided that the inlet nozzle provided in the separating region has an inlet area that is essentially circular.

Further, it can be provided that the inlet nozzle provided in the separating region has an inlet area in the range from 0.05 $mm^2$ to 20 $mm^2$, preferably in the range from 0.5 $mm^2$ to 15 $mm^2$, particularly preferred in the range from 0.5 $mm^2$ to 10 $mm^2$ and especially preferred in the range from 0.8 $mm^2$ to 5 $mm^2$. In a further embodiment, it can be provided that the inlet nozzle provided in the separating region has an inlet area in the range from 2 $mm^2$ to 40 $mm^2$, preferably in the range from 4 $mm^2$ to 20 $mm^2$ and especially preferred in the range from 5 $mm^2$ to 15 $mm^2$. This value refers to the size of a single inlet nozzle if several inlet nozzles are used.

In case the inlet nozzle is in the form of a bore, then it preferably has a diameter in the range from 0.3 mm to 5 mm, preferably 0.5 mm to 4 mm, particularly preferred 0.8 mm to 3 mm, particularly preferred 1 mm to 2 mm and/or especially preferred 2 to 3 mm This value refers to the size of a single inlet nozzle if several inlet nozzles are used.

Further, it can be provided that the ratio of the inlet area of the inlet nozzle provided in the separating region to the volume of the gas-liquid separator lies in the range from 0.01 mm$^2$/ml to 1 mm$^2$/ml, preferably in the range from 0.04 mm$^2$/ml to 0.4 mm$^2$/ml, particularly preferred in the range from 0.08 mm$^2$/ml to 0.25 mm$^2$/ml and especially preferred in the range from 0.08 mm$^2$/ml to 0.17 mm$^2$/ml. This value refers to the sum of the areas of all inlet nozzles used if several inlet nozzles are used.

Further, it can be provided that the ratio of the inlet area of the inlet nozzle provided in the separating region to the volume of the separating region lies in the range from 1:3 mm$^2$/ml to 1:50 mm$^2$/ml, preferably in the range from 1:5 mm$^2$/ml to 1:20 mm$^2$/ml and especially preferred in the range from 1:7 mm$^2$/ml to 1:15 mm$^2$/ml. In a further embodiment, it can be provided that the ratio of the inlet area of the inlet nozzle provided in the separating region to the volume of the separating region is in the range from 4:1 mm$^2$/ml to 1:50 mm$^2$/ml, preferably in the range from 1:1 mm$^2$/ml to 1:20 mm$^2$/ml and especially preferred in the range from 2:3 mm$^2$/ml to 1:5 mm$^2$/ml. This value refers to the sum of the areas of all inlet nozzles used if several inlet nozzles are used.

In the separating region, one or more inlet nozzles can be provided. In case that several inlet nozzles are provided, they are preferably aligned in parallel. Preferably, the gas-aerosol mixture is introduced into the separating region by means of exactly one inlet nozzle, preferably onto the baffle unit located in the separating region.

Further, it can be provided that the inlet nozzle is designed such that a gas-liquid flow directed through the inlet is able to impinge against the baffle unit and the angle at which a gas-liquid flow directed through the inlet nozzle is able to impinge onto the baffle unit lies preferably in the range from 50 to 130°, particularly preferred in the range from 70 to 110°. This angle can in particular be determined by the direction of the inlet nozzle with which the inlet nozzle is directed to the baffle unit. This information relates to the angle at which the main jet of the aerosol is directed onto the baffle unit. The shape of the aerosol jet in itself is insignificant insofar as impact separation can be effectuated. Here, the liquid droplets of the aerosol should flow together as a result of impinging onto the baffle unit and preferably form a film. Therefore, the inlet nozzle should be chosen such that the liquid droplets of the aerosol do not become too small.

The gas-liquid separator preferably has a separation opening that is disposed between the separating region and the dividing region, so that there is a gas and liquid-open connection between these sections. The separation opening preferably effectuates an inertial separation. This means that liquid flowing downwards on the baffle unit and/or the gas-guiding unit in the form of a liquid film will separate from the gas by inertia. Here, the gas preferably accelerates the liquid so that the liquid is transferred into the dividing region at a higher speed than without this gas acceleration. Here, the liquid film preferably remains on a wall of the separating region, which is preferably configured as part of the baffle unit and/or the gas-guiding unit, in the form of a film and passes directly into the dividing region without the liquid film leaving this wall that continues into the dividing region. In contrast to the liquid phase, the gas phase does not adhere to a wall, but is able to exit upwards and pass into the gas discharge region. In contrast to this, the liquid is drained into the dividing region and removed from the gas-liquid separator through the liquid outlet provided in the dividing region.

The shape of the separation opening is not critical insofar as the previously described function of the same can be fulfilled. Preferably, however, it can be provided that the separation opening has an outlet surface that is slit-shaped or has a plurality of openings arranged in parallel that can be U-shaped, V-shaped or circular, for example.

Preferably, the distance of the inlet nozzle from the baffle unit is greater than the smallest length dimension of the separation opening. Here, the distance of the inlet nozzle from the baffle unit results from the path of the aerosol from leaving the inlet nozzle until it impinges onto the baffle unit. The smallest length extension of the separation opening relates to the width or length of the separation opening, wherein the extension of the plane up to the edge of the separation opening is related to the plane between the separating region and the dividing region that leads to a minimal area of the separation opening. In this plane, in which the separation opening lies, the length of the longest extension of the separation opening is determined, so that the shortest length of the separation opening that is perpendicular to the longest extension of the separation opening can then be measured. This smallest length extension can also be regarded as the width of the separation opening here.

In case the separation opening is slit shaped, it preferably has a slit width in the range from 0.1 mm to 1.5 mm, particularly preferred 0.3 mm to 1.0 mm and especially preferred 0.4 mm to 0.7 mm (smallest length extension). The length of the slit in case of a circular or elliptical separation opening is given by the circumference, wherein these values preferably lie in the range from 5 mm to 120 mm, particularly preferred in the range from 10 mm to 60 mm.

In case of a non-circular or non-elliptical separation opening with a slit shape that is preferably characterized by two ends, the length thereof lies preferably in the range from 3 to 80 mm, preferably in the range from 5 to 50 mm, particularly preferred in the range from 15 to 30 mm.

In case the separation opening is realized by a plurality of openings disposed in parallel that can be, for example, U-shaped, V-shaped or circular, the dimensions set out above apply accordingly, the openings preferably having a width in the range from 0.1 mm to 1.5 mm, particularly preferred 0.3 mm to 1.0 mm and especially preferred 0.4 mm to 0.7 mm (smallest length extension). In a further embodiment, the openings can preferably have a width in the range from 0.1 mm to 3.0 mm, particularly preferred 0.3 mm to 2.0 mm and especially preferred 0.4 mm to 1.5 mm (smallest length extension).

The slit width is measured perpendicular to the length or the circumference of the slit and is the smaller length extension of the slit opening that can be regarded as a transition plane from the separating region to the dividing region. This transition plane has the smallest two-dimensional extension in the region of the transition from the separating region to the dividing region.

Preferably, the separation opening has an outlet area in the range from 10 to 120 mm$^2$, particularly preferred in the range from 15 to 60 mm$^2$ and especially preferred in the range from 15 to 40 mm$^2$. In a further embodiment, the separation opening can have an outlet area in the range from 10 to 180 mm$^2$, particularly preferred in the range from 15 to 120 mm$^2$ and especially preferred in the range from 30 to 100 mm$^2$. Further, it can be provided that the ratio of the outlet area of the separation opening to the volume of the gas-liquid separator lies in the range from 0.05 mm$^2$/ml to 2 mm$^2$/ml, particularly preferred in the range from 0.1 mm$^2$/ml to 1 mm$^2$/ml and especially preferred in the range from 0.3 mm$^2$/ml to 0.8 mm$^2$/ml. In a further embodiment, it can be provided that the ratio of the outlet area of the separation opening to the volume of the gas-liquid separator is in the range from 0.05 mm$^2$/ml to 6 mm$^2$/ml, particularly preferred in the range from 0.3 mm$^2$/ml to 3 mm$^2$/ml and especially preferred in the range from 0.5 mm$^2$/ml to 2.0 mm$^2$/ml.

The spatial shape of the separating region is not critical and can be adapted as needed. Here, a gas-guiding unit is preferably formed in the separating region. The gas-guiding unit causes a change in the flow velocity of a gas, so that a lower gas velocity prevails in the region of the inlet nozzle than in the region of the separation opening. Since the volume flow can be regarded as constant for the same aerosol composition, this means that the aerosol is first led into a relatively large space that is subsequently narrowed, so that the flow velocity increases.

Accordingly, the cross-sectional area of the separating region, for example, can be circular, wherein, for example, this is preferably narrowed wedge-shaped from the inlet nozzle towards the separation opening.

In a preferred embodiment, the separating region does not have a circular cross-sectional area in the region of the inlet nozzle, wherein the separating region preferably comprises at least three sidewalls which, together with an upper end, define a space that is connected to the dividing region via the separation opening. This embodiment, in which the separating region does not comprise a circular cross-sectional area, but a cross-sectional area with corners, in particular a triangular, quadrangular, pentagonal or hexagonal cross-sectional area, particularly preferred a quadrangular one, is easier to produce with a required precision, wherein the volume of the gas-liquid separator can be adapted better to the requirements. In particular, gas-liquid separators can also be provided that are suitable for particularly small volume flows. In contrast to gas-liquid separators with a circular cross-sectional area, gas-liquid separators with a non-circular cross-sectional area, preferably a cross-sectional area with corners, can have exactly one inlet nozzle without regions of inadequate wetting with gas-liquid mixture occurring.

Preferably, it can be provided that the gas-guiding unit has at least two essentially flat sidewalls that can be regarded as gas-guiding plates, wherein these gas-guiding plates preferably form walls of the separating region. These two essentially flat sidewalls can converge towards one another so that a wedge shape is formed.

Further, it can be provided that the gas-guiding unit has at least two sidewalls, wherein at least one of the sidewalls is curved, so that a concave shape is provided such that the two sidewalls can converge, wherein in the upper region of the separating region that is defined by the proximity of the inlet nozzle, the distance between the sidewalls is greater than in the lower region of the separating region that is defined by the proximity of the separation opening, wherein the decrease in the distance decreases in the direction from the upper region to the lower region.

Preferably, it can be provided that the gas-guiding unit includes a gas acceleration unit which, together with at least one sidewall, preferably at least two sidewalls, brings about a change in the flow velocity of a gas.

In a further configuration, it can be provided that the cross-sectional area of the gas-guiding unit decreases from the inlet nozzle in the direction of the separation opening at least in sections, preferably in the region facing the separation opening, so that the planes that are perpendicular to the direction of flow of the gas-liquid mixture become smaller, wherein this decrease is preferably continuous, so that preferably at least two of the sidewalls of the gas-guiding unit form a wedge shape in longitudinal section.

In a further configuration it can be provided that the separating region comprises an upper end, wherein this upper end comprises a curvature or an angle, the highest point of the curvature or the angle preferably being disposed in the center, and thus lying in line with the inlet nozzle that are parallel to the direction of gas flow or the direction of flow of the liquid, thus thought to be parallel to the direction of gas inlet-liquid outlet opening, wherein the upper end preferably merges into two sidewalls, so that the transition between the sidewalls and the upper end is curved.

In a further development of the present invention, it can be provided that the separating region comprises at least four sidewalls which, together with an upper end, define a space that forms the gas-guiding unit, wherein one of the sidewalls is formed as a baffle unit, wherein this space is connected to the dividing region via the separation opening. In this embodiment, in which the separating region comprises at least four sidewalls that together with an upper end, define a space, it can preferably be provided that the distance between two opposite sidewalls is greater than half the distance of the inlet nozzle from the baffle unit. Preferably, in this embodiment, in which the separating region comprises at least four sidewalls that together with an upper end, define a space, it can be provided that the ratio of the distance between two opposite sidewalls to the distance of the inlet nozzle from the baffle unit lies in the range from 0.8 to 8, particularly preferred in the range from 0.9 to 6, especially preferred in the range from 1.0 to 4 and particularly preferred in the range from 1.2 to 2. These values relate in particular to two opposite sidewalls that have the greatest distance.

Further, it can be provided that the inlet nozzle is provided in the upper region of the separating region, particularly preferred in the upper third of the separating region, wherein this direction results from the disposition of the inlet and the liquid outlet, so that the inlet nozzle is disposed above the liquid outlet.

Besides the separating region described above, a gas-liquid separator according to the invention has a dividing region. In the dividing region, as already indicated, the phases are separated, wherein the dividing region has a liquid outlet through which the liquid phase is removable from the gas-liquid separator. The gas phase is led into the gas discharge region. Accordingly, the dividing region is connected to the gas discharge region by means of an opening and is in fluid communication with the same.

Preferably, it can be provided that the dividing region with a liquid outlet comprises a bottom that preferably comprises a curvature, a bend, an angle or another shape that leads to a taper, wherein the liquid outlet is provided in the region of the lowest point of the bottom.

Further, it can be provided that the liquid outlet is provided in the lower region of the dividing region, particularly preferred in the lower third of the dividing region, wherein this direction results from the disposition of the inlet nozzle and of the liquid outlet, so that the inlet nozzle is disposed above the liquid outlet.

In a further embodiment, it can be provided that the inner surface of the dividing region has a surface region with a surface energy in the range from 15 to 120 mN/m, particularly preferred in the range from 20 to 80 mN/m and especially preferred in the range from 22 to 60 mN/m m, wherein preferably at least 80%, particularly preferred at least 90%, of the surface of the dividing region has a surface energy in the range from 20 to 80 mN/m, especially preferred in the range from 22 to 60 mN/m. Preferably, the difference between the surface energy of the inner surface of the dividing region and the surface energy of the inner surface of the separating region can be at least 10 mN/m, preferably at least 30 mN/m, wherein these values relate to the respective maxima or minima, so that the difference is maximum.

Further, it can be provided that the separating region has a cross-sectional area in the region of the inlet nozzle that is at least 80%, preferably at least 90%, of the maximum cross-sectional area of the dividing region, wherein the cross-sectional areas are related to the planes that are perpendicular to the baffle unit and perpendicular direction main impact point of the gas-liquid mixture opening.

The gas discharge region serves to discharge the gas phase from the gas-liquid separator, so that it comprises a gas outlet.

Preferably, the gas discharge region is configured such that the gas speed at the gas outlet is at a maximum, preferably the gas speed increases in the gas flow direction from the dividing region in the direction of the gas outlet. Hereby, a suction effect can be brought about that leads to safe and low-maintenance operation of the gas-liquid separator. Further, the volume of the gas-liquid separator can be reduced hereby without the performance capability of other properties, for example the segregation properties, decreasing.

In reverse of the separating region, the space therefore decreases from the direction of the dividing region towards the gas outlet. Preferably, the cross-sectional area tapers from the direction of the dividing region towards the gas outlet.

In a further development of the gas-liquid separator, it can be provided that the gas discharge region is configured in such a manner that the area of imaginary planes that are perpendicular to the direction from the dividing region towards the gas outlet decreases from the dividing region towards the gas outlet, wherein this decrease is preferably continuous, wherein the gas-guiding unit preferably forms a sidewall of the gas discharge region and in the longitudinal section this side of the gas-guiding unit forms a wedge shape with a further sidewall of the gas discharge region.

Further, it can be provided that the gas outlet is provided in the upper region of the gas discharge region, particularly preferred in the upper third of the gas discharge region, wherein this direction results from the disposition of the inlet nozzle and of the liquid outlet, so that the inlet nozzle is disposed above the liquid outlet.

Furthermore, it can be provided that the inner surface of the gas discharge region has a surface region with a surface energy in the range from 10 to 40 mN/m, preferably at least 80%, particularly preferred at least 90%, of the surface of the gas discharge region having a surface energy in the range from 10 to 30 mN/m.

In addition, it can be provided that the separating region is disposed above the dividing region and the gas discharge region is disposed above the dividing region, wherein this direction results from the disposition of the inlet nozzle and the liquid outlet, so that the inlet nozzle is disposed above the liquid outlet.

Further, it can be provided that the separating region is disposed above the dividing region and the gas discharge region is disposed above the dividing region, wherein this direction results from the disposition of the inlet nozzle and the liquid outlet, so that the inlet nozzle is disposed above the liquid outlet.

Furthermore, it can be provided that the volume ratio of the separating region to the dividing region lies preferably in the range from 4:1 to 1:10, preferably in the range from 2:1 to 1:6 and especially preferred in the range from 1:1 to 1:3.

In a further embodiment, it can be provided that the volume ratio of the separating region to the gas discharge region lies preferably in the range from 10:1 to 1:10, preferably in the range from 5:1 to 1:5 and especially preferred in the range from 2:1 to 1:2.

Further, it can be provided that the volume ratio of the dividing region to the gas discharge region is preferably in the range from 10:1 to 1:4, preferably in the range from 6:1 to 1:2 and especially preferred in the range from 3:1 to 1:3.

Further, it can be provided that the height of the separating region is preferably in the range from 1 cm to 100 cm, especially preferred in the range from 5 cm to 20 cm.

Further, it can be provided that the height of the dividing region is preferably in the range from 0.5 cm to 20 cm, particularly preferred in the range from 2 cm to 5 cm.

Further, it can be provided that the height of the gas discharge region is preferably in the range from 0.5 cm to 20 cm, particularly preferred in the range from 2 cm to 5 cm.

Further, it can be provided that the ratio of the height of the separating region to the height of the dividing region lies preferably in the range from 1:2 to 10:1, particularly preferred in the range from 1:1 to 7:1 and especially preferred in the range from 3:1 to 6:1.

Further, it can be provided that the ratio of the height of the dividing region to the height of the gas discharge region lies in the range from 2:1 to 1:10, particularly preferred in the range from 1:1 to 1:7 and especially preferred in the range from 1:3 to 1:6.

The preferred properties of the gas-liquid separator described above require a definition of the different sections that are each in fluid communication with one another, since the mixture of gas and liquid phase is transferred through the separating region into the dividing region, in which the liquid is separated from the gas phase and the gas is transferred to the gas discharge region. Here, the separation opening forms the partition between the separating region and the dividing region, wherein the plane in which the separation opening ends marks the transition to the dividing region.

The transition between the dividing region and the gas discharge region is also marked by an opening that is, however, relatively large compared to the separation opening. This opening is defined by the plane that is disposed at the height of the separation opening and runs perpendicular to the direction of the gas flow direction of the gas-liquid mixture in the separating region or parallel to the flow direction of the gas phase, as soon as this the separation opening coming from the separating region continues into the dividing region or is parallel to the liquid level during operation. The plane defined by the extension of the opening is selected such that it represents the minimum area between the dividing region and the gas discharge region, wherein this plane touches the separation opening and is essentially parallel to the bottom of the dividing region or is parallel to the liquid level during operation.

Further, it can be provided that the ratio of the inlet area of the inlet provided in the separating region to the distance between the inlet and the baffle unit is in the range from 5:1 mm$^2$/mm to 1:10 mm$^2$/mm, preferably 2:1 mm$^2$/mm to 1:5 mm$^2$/mm.

A gas-liquid separator to be preferred in use can be fabricated from any known material, as long as the requirements made by the solvents and the physical conditions are met. Preferably, a transparent material can be used, through which the segregation process is visible, so that a rapid error analysis is made possible in the event of deposit formation or the like.

Preferably, the gas-liquid separator can be fabricated from metals that are preferably acid and base resistant, from mineral glasses and/or plastics, for example fluoropolymers, polyether ether ketone (PEEK) or similar materials that are preferably solvent resistant.

The gas-liquid separator preferably has a volume in the range from 20 ml to 100 ml, particularly preferred in the range from 20 ml to 70 ml, especially preferred in the range from 20 ml to 50 ml. In case of an essentially cuboid shape that can be configured in the form of a bend or dome in the upper and/or lower region of the gas-liquid separator that is given by the inlet nozzle or by the liquid outlet, the height of the gas-liquid separator is preferably in the range from 8 cm to 150 cm, particularly preferred in the range from 10 cm to 12 cm, wherein the height is given by the length extension in the direction of gas flow as from the inlet nozzle in the direction of the liquid outlet. The width and depth of the gas-liquid separator are each preferably in the range from 15 mm to 60 mm, particularly preferred in the range from 15 mm to 25 mm.

Preferably, it can be provided that the gas-liquid separator is not cylindrical, preferably not circularly cylindrical, preferably has an essentially cuboid basic structure that has an upper and a lower arched cover.

The structure and manufacture of a gas-liquid separator can be done in any manner. According to a preferred embodiment, the gas-liquid separator can be configured such that it can be dismantled, so that individual components can be assembled and disassembled. Hereby, the gas-liquid separator can be cleaned easily if dirty. For example, a substantially cuboid base body can be fabricated with a suitable cutout, on which a cover that serves as a sidewall is attached via a screw connection. The sidewall serving as a cover can assume the function of the baffle unit and/or as a part of the gas-guiding unit, as was described above. A further part of the gas-guiding unit that preferably furthermore represents a sidewall of the gas discharge region can in this embodiment be fastened in the essentially cuboid base body with a suitable cutout by a positive fit, by welding, preferably laser welding, adhesive or the like, so that the sections set out above, in particular at least one separating region, at least one dividing region and at least a gas discharge region are created.

The gas-liquid separator can generally be operated at atmospheric pressure. However, to avoid accumulation of larger amounts of liquid, e.g. of methanol, the gas-liquid separator can be operated at a moderate internal backpressure, for example, in the range from 0.1 bar to 4 bar by a backpressure regulator. Accordingly, it can be provided that in the chromatography system, downstream of the gas outlet, a backpressure regulator is provided that preferably is controllable in the range from 1 bar to 4 bar excess pressure (absolute pressure 2 bar to 5 bar), preferably 2 bar to 3 bar excess pressure. The liquid component collected via the dividing region and made available through the liquid outlet channel nonetheless enables automated fractionation that can be operated under atmospheric pressure. With the help of the gas-liquid separator and comparable to conventional HPLC analysis, a fully automatic fraction collection can also be realized for SFC analysis.

Since the inner walls and components of the gas/liquid separator in the separation and dividing regions are essentially continuously moistened, not only can a self-cleaning effect develop, but also a relatively low degree of cross-contamination of samples can be achieved. As a further advantage, the separator induces a relatively small peak broadening in the resulting chromatograms.

Depending on the type of gas, the gas phase of the aerosol can be collected and processed or, for example, when $CO_2$ is used, also released into the environment.

Further, it can be provided that the chromatography system has a gas-liquid separator and a control valve is provided downstream of the gas outlet of the gas-liquid separator.

The liquid phase of the aerosol is collected in a fraction collector. It is particularly preferred that the fractions collected are automatically collected as main fractions, while excess solvent can be subjected to processing or disposal.

The connecting line between the liquid outlet of the gas-liquid separator and the fraction collector can preferably be configured such that residues of the gas phase, preferably $CO_2$ residues, can escape via this connection. In particular, it can be provided that the chromatography system includes a gas-liquid separator and a device for further segregation of gas, preferably a gas-permeable hose, is provided downstream of the gas-liquid separator. For this, a semipermeable plastic material can be used, for example Teflon, particularly preferred AF 2400 (commercially available from DuPont).

The number and size of the collecting vessels within the fraction collector are not subject to any particular restriction. Preferably, the fraction collector comprises at least 5 collecting vessels, preferred at least 10 collecting vessels, and especially preferred at least 25 collecting vessels. Further, it can be provided that the fraction collector comprises collecting vessels that have a collection volume in the range from 5 to 500 ml, preferably 10 to 100 ml.

Preferably, the fraction collector comprises collecting vessels that essentially have the same collection volume. An essentially same collection volume means, for example, that the collection volume of the individual collecting vessels differs by at most 10 ml, preferably by at most 5 ml.

Further, it can be provided that the collecting vessels of the fraction collector are configured as impact separators, wherein the fraction to be collected preferably is introduced at an angle in the range from 70 to 120°, relative to the vertical, against a wall of the collecting vessel.

Preferably, it can be provided that the chromatography system comprises a UV detector. Furthermore, it can be provided that the chromatography system comprises a mass spectrometer as detector. In a particularly preferred embodiment, the system comprises a UV detector and a mass spectrometer.

The SFC chromatography system is preferably operable at a volume flow in the range from 10 ml/min to 450 ml/min, particularly preferred in the range from 50 ml/min to 300 ml/min and especially preferred 100 ml/min to 250 ml/min. Furthermore, it can be provided that the SFC chromatography system is preferably operable at a volume flow of at least 10 ml/min, particularly preferred of at least 50 ml/min and especially preferred of at least 100 ml/min.

Surprisingly, the method according to the invention can also be carried out using conventional HPLC systems after manageable conversions.

According to a further aspect, a conversion kit is also provided, by means of which a high-performance liquid chromatography system (HPLC) can be converted into an SFC system. Such a kit preferably comprises at least one gas-liquid separator, as described above. Preferably, the kit contains further components, as described below, in order to convert an HPLC system into an SFC system, for example, heat exchangers or backpressure regulators.

In many cases, the control unit of an HPLC system is not freely accessible, but limited to the input of common parameters, such as flow rate, volumes of the collecting vessels of the fraction collector, the time span it takes for a liquid to be collected to cover the distance between the detector signal and the fraction collection valve, etc. A variable flow rate, as is the case in the present case due to a preferred segregation of the second solvent on the fraction collector, frequently cannot be programmed into the control unit of an HPLC system. To avoid this difficulty, a programmable logic controller (PLC unit) can preferably be provided.

In a preferred embodiment, furthermore a second control unit, for example a programmable logic controller (PLC unit), is provided that is operatively connected to the control unit of the HPLC system, the pumps, in particular the pump for the first solvent, and/or the fraction collector of this system. Further, the second control unit, for example the PLC unit, can be connected to the detection unit, for example a mass spectrometer and/or a UV detector, for example, in order to send a control signal to the control unit of the HPLC system.

To program a variable flow rate in a provided controller, the flow rate of the first solvent can preferably be determined, which can be done, for example, by measuring the first solvent flow with a flow sensor upstream or downstream of the solvent pump. Further, pumps can be used which allow the signals provided by the chromatography software to be read out. The corresponding signals are correspondingly sent to the second control unit, for example the PLC unit, and processed by the same.

Preferably, in a further step, the system dead volume between the pump and the fraction collection valve can be determined. This dead volume creates a system delay time of the incoming solvent composition at the fraction collection valve during gradient mode. The dead volume consists of the internal volume of all capillaries/pipes between the pump and the fraction collection valve, the internal volume of the chromatography column (porosity of the stationary phase must be taken into account). To determine the dead volume between the pump and the fraction collection valve, a UV-absorbing solvent can be used, for example, as the second solvent, wherein on the basis of its gradient that can be determined on the UV detector and that can be collected accordingly in the fraction collector, the dead volume or the dead time can be determined. Further, the dead volume can be estimated roughly and a first test run can be carried out on the basis of this estimate, wherein all fractions are collected (threshold value=0). On the basis of the fill level of the individual collecting vessels, the dead volume or the dead time can then be optimized. In case the fill level is too low, the dead volume or the dead time was estimated too small/short; if the fill level is too high (especially in the case of an overflow), the dead volume or the dead time was estimated too large/long.

To carry out this modification of the present method, the second control unit, for example the PLC unit, provides a control signal to the control unit of the HPLC system, which can take place in dependence of the specific embodiment. For example, the second control unit, for example the PLC unit, can be connected to the control unit of the HPLC system by means of an input for a further detector or by means of a corresponding interface. Further, the second control unit, for example the PLC unit, can often be interposed between the signal of a detector, preferably a UV detector, and the control unit of the HPLC system, so that the signals of the detector are first transferred to the second control unit, for example the PLC unit, and then from the second control unit, for example the PLC unit, subsequently into the control unit of the HPLC system.

Further, to carry out this modification of the present method, the volume value of a collecting vessel of the fraction collector should be set accordingly high in order to prevent the control unit of the HPLC system from switching prematurely. With an actual volume of 20 ml, for example, the volume value of a collecting vessel of the fraction collector of at least 300 to 400 ml should be entered, depending on the portion of the first solvent.

When converting a conventional HPLC system that does not allow extensive access to the control system, the fraction collector in particular can be controlled at least partially by means of a second control unit that is designed, for example, as a PLC unit, the second control unit, for example the PLC unit, being operatively connected to the fraction collector and preferably providing the second control unit, for example the PLC unit, with data about the pump power or the flow rate and the gradient. Further, the second control unit, for example the PLC unit, is provided with detector data, preferably signals from a UV detector.

The control of the fraction collection valve is preferably at least partially configured via the control unit of the HPLC system. Hereby, the signal recognition of a signal detected by a detector as a fraction to be collected is preferably implemented by the control unit of the HPLC system, while a change of the collecting vessel is preferably effectuated via the second control unit that is configured, for example, as a PLC unit.

The signal detection can take place, for example, via a threshold value (signal level) and the slope of the signal curve or other factors of the signal detected by the detector and transmitted to the control unit of the HPLC system, wherein the latter accordingly switches the fraction collection valve and fills the collecting vessel. In general, the collecting vessel is filled until the signal no longer meets the criteria, for example, a detected peak falls below the intended threshold. In case the collection time for this peak is longer than the specified volume of the collecting vessel, the collection process is briefly interrupted in order to continue the collection process at the next empty collecting vessel.

The problem here, as already stated, is that conventional HPLC software cannot take into account any flow gradients that, according to the preferred embodiments, are present at the fraction collection valve, since the second solvent is preferably predominantly separated and the compositions to be collected predominantly contain the first solvent.

The calculation of the maximum fill level by the control unit of the HPLC system is preferably avoided by storing a fraction collection volume in the software for controlling the HPLC system, which is, for example, 10-20 times larger than that of the real fraction glasses. The signal detection (peak detection) is, however, preferably unaffected, i.e. fraction end still takes place via the software of the control unit of the HPLC system. Since, in preferred embodiments, a continuously increasing flow gradient is present at the fraction collection valve, the maximum fraction collection time decreases accordingly. The maximum fraction collection time is therefore preferably provided by a second control unit, for example a PLC unit.

For this purpose, the flow rate is determined, wherein this can be done according to the above methods. The gradient course of the first solvent is preferably periodically stored in a memory array of the second control unit, for example the PLC unit. Depending on the resolution, any number of memory lines can be used. Good results can be achieved, for example, with a resolution of one memory line per second.

This relationship can be represented, for example, using the following formula (II):

$$\sum_{t=t_s}^{t_n} F_{L1(t)} \Delta A_s = V_{max} \quad \text{Formula (II)}$$

wherein:

$F_{L1\ (t)}$ is the volume flow of the first solvent at time t (measured at or calculated for the fraction collection valve)

$\Delta A_s$ is the period of time over which the volume of a single volume component is calculated, wherein this results from the resolution of the memory array. The resolution of the memory array results from the number of memory cells and the dead time of the system (transit time between pump outlet and fraction collection valve).

$V_{max}$ is the maximum volume of the collecting vessel $t_s$ is the start time at which the detector signal indicates a fraction to be collected and when it is collected $t_n$ is the end time up to which a fraction to be collected can be introduced into a collecting vessel Accordingly, the total volume is continuously calculated from the sum of the individual volume components and, at the point in time at which this total volume is equal to the maximum volume of the collecting vessel, a signal is sent to the fraction collector to perform a change of the collecting vessel. Here, the maximum volume of the collecting vessel ($V_{max}$) is selected such that overflow of the collecting vessel can be avoided.

The following numerical example is given as an explanation, without any restriction being intended:

With a memory line resolution of 1 s and a system delay time of 60 s, a memory array of 60 lines is required. Therefore, in this memory array, the current gradient curve of the last 60 s is always stored and updated every second. Thus, the memory value that is 60 s "old" is overwritten with the current flow value. However, the overwriting takes place only after this value has been read out, for example, for the calculation of the collection volume.

From the point in time at which the fraction collection valve switches, the PLC (via the control voltage of the valve) receives the signal to integrate the accumulated volume in the fraction glass. Here, the gradient course is taken into account. Thus, from the "oldest" memory line that corresponds to the portion of the first solvent at the fraction collection valve, it is added up to the second and compared with the stored fraction volume. In case the total fraction volume is the same as the fraction volume stored (stored in the PLC), the PLC sends a signal to the chromatography software to change the fraction collection vessel. The type and length of this signal depends on the HPLC system to be converted. For example, a corresponding signal can be sent to the HPLC control unit via the input of the UV detector, which is, for example, 500 ms long.

In the chromatography software, a corresponding trigger has been programmed so that the UV detector and the PLC detector are logically linked.

From this, for example, the following relationships arise:

$T_{sys}$ = System delay time = 60 s $n_{sz}$ = number of memory lines = 60

Memory clock: 1 Hz (a new memory line is written every second)

$A_S$ = resolution of the memory array = $\frac{T_{SYS}}{n_{SZ}} = \frac{60\ s}{60} = 1\ s$ $F(t)_G$ = flow at point in time $t$ in gradient curve in ml/min $V_S$ = memory line volume = $\frac{F(t)_G}{60} \cdot A_S$ $V_{max}$ = maximum fraction volume that can be summarized in the following formula $$\sum_{F(t)_{G\,Start}}^{F(t)_{G\,End}} (V_S) = V_{max}$$

If the HPLC system to be converted has a significant delay between the switching signal and the actual switching at the fraction collection valve, this switching delay must be taken into account when calculating the volume. This is often the case if the HPLC system to be converted, for example, is equipped with a mass spectrometer. The evaluation of the mass spectrometry signal generally requires a relatively long period of time that is often in the range from 1 s to 10 s, for example approximately 4 s to 6 s. Often in these systems, an additional volume is therefore provided, as is explained in more detail earlier and below.

Preferably, it can be provided that the degree of filling of the collecting vessel takes place via a summation of the volume that is introduced into the collecting vessel over a period of time, wherein the individual volume components of the sum formation is determined using the products of the flow rate, the period of time over which the volume component is collected, and the portion of the first solvent in the solvent composition at the start time of the respective volume component, wherein the time required for determining the mass spectrometry signal is taken into account by an additional volume during the summation, wherein the volume of the collecting vessel is stored in the control unit.

This relationship can be represented, for example, using the following formula (III):

$$\sum_{t=t_s}^{t_n} F_{L1(t)} \Delta A_s + \sum_{t=t_n}^{t_n+T_V} F_{L1(t)} \Delta A_s = V_{max} \quad \text{Formula (III)}$$

wherein:

$F_{L1\ (t)}$ is the volume flow of the first solvent at time t (measured at the fraction collection valve)

$\Delta A_s$ is the period of time over which the volume of a single volume component is calculated, wherein this results from the resolution of the memory array. The resolution of the memory array results from the number of memory cells and the dead time of the system (transit time between pump outlet and fraction collection valve).

$V_{max}$ is the maximum volume of the collecting vessel
$i_s$ is the start time at which the detector signal indicates a fraction to be collected and when it is collected
$t_n$ is the end time up to which a fraction to be collected can be introduced into a collecting vessel
$\tau_v$ is the delay time, thus the time between the switching signal and the actual switching at the fraction collector valve Accordingly, an additional volume for calculation that is calculated continuously is provided compared to formula (II).

From this, for example, the following relationships arise:
Assumption: 6 s signal delay time of mass spectrometer
Today's mass spectrometers have a signal processing time of up to 6 s compared to the UV detector signal.

In case the HPLC system to be converted has a signal delay time of 6 s, the PLC signal must be output 6 s earlier, otherwise the fraction glass would overflow by the volume of the 6 s. When the fraction starts, the volume of the following 6 s is added from the beginning during volume calculation. Here, the gradient course is continuously monitored for the period of 6 s.

Using the symbols explained earlier, this can be summarized in the following formula:

$$\sum_{F(t)_{G\,Start}}^{F(t)_{G\,End}} (V_S) + \sum_{F(t)_{current}}^{F(t)_{current+6s}} (V_S) = V_{max}$$

Here, $F_{(t)\,current}$ corresponds to the respective flow of the first solvent, wherein $F_{(t)\,current}$ corresponds to $F_{(t)\,G\,End}$ in the end.

BRIEF DESCRIPTION OF THE DRAWINGS

In the following, preferred embodiments of the present invention shall be described by way of example with reference to four figures, without any restriction of the invention being intended. The following are shown.

DETAILED DESCRIPTION

Figure 1:
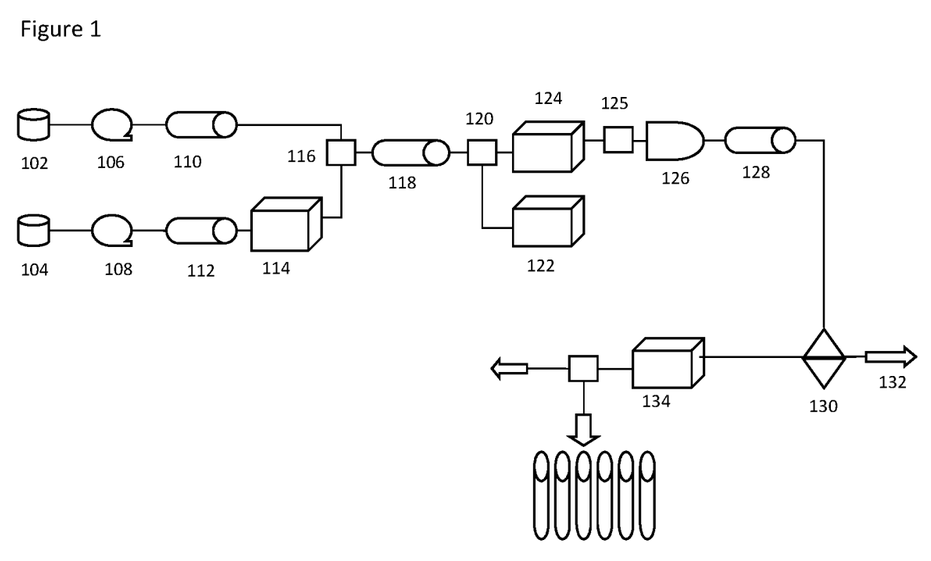
FIG. 1 shows a schematic representation of a chromatography system for carrying out the present method.

FIG. 1 shows a schematic representation of a chromatography system 100 with a gas-liquid separator 130 according to the invention that is suitable for supercritical liquid chromatography.

Such a system is described by way of example using supercritical $CO_2$, wherein methanol is shown as an exemplary solvent. Obviously, systems in which other solvents, preferably organic solvents are applied, or other supercritical fluids are used, have a similar structure.

As shown in FIG. 1, the respective fluids are kept in storage containers, in particular the gas that is still used in a supercritical state is provided in a storage tank 102 and the solvent is provided in a storage tank 104, and they can be conveyed out of the storage tanks 102, 104 to the further components of the system by means of a pump 106, 108 respectively. In the system 100 described here, a preparation stage 110, 112 is preferably provided in each fluid feed line, by means of which the liquids can be temperature controlled. Further, a leveling of the pressure fluctuations indicated by the pumps can also be provided. Accordingly, this preparation stage can be designed, for example, as a heat exchanger or as a pump. In the solvent line, an addition unit 114 can preferably be provided, for example an injector, by means of which a mixture to be segregated is introduced into the system 100 before the $CO_2$ and the solvent are passed into a mixer 116 and from there to a chromatography column 118.

In the present system 100, two analysis units are arranged downstream of the chromatography column 118, wherein a sample discharge unit 120 is connected to a mass spectrometer 122 and a UV detector 124 is provided downstream of the sample discharge unit. Downstream of the analysis unit, a device for providing an additional volume 125 is provided that serves in particular to increase the transit time of the liquid to be able to evaluate the results, for example, of the mass spectrometer 122. The backpressure regulator 126 provided in the line downstream of the device for providing an additional volume 125 maintains the respective pressure that is necessary for the fluid to remain in a supercritical state. Downstream of the backpressure regulator 126, a heat exchanger 128 is provided that prevents the aerosol from freezing during the expansion process. Subsequently, the aerosol is introduced into a gas-liquid separator 130 according to the invention, wherein the gas in the system is discharged via an outlet 132.

The liquid is introduced into a fraction collector 134 and fractionated therein. The solvent contained in the fractionated samples can be removed from the samples.

Figure 2:
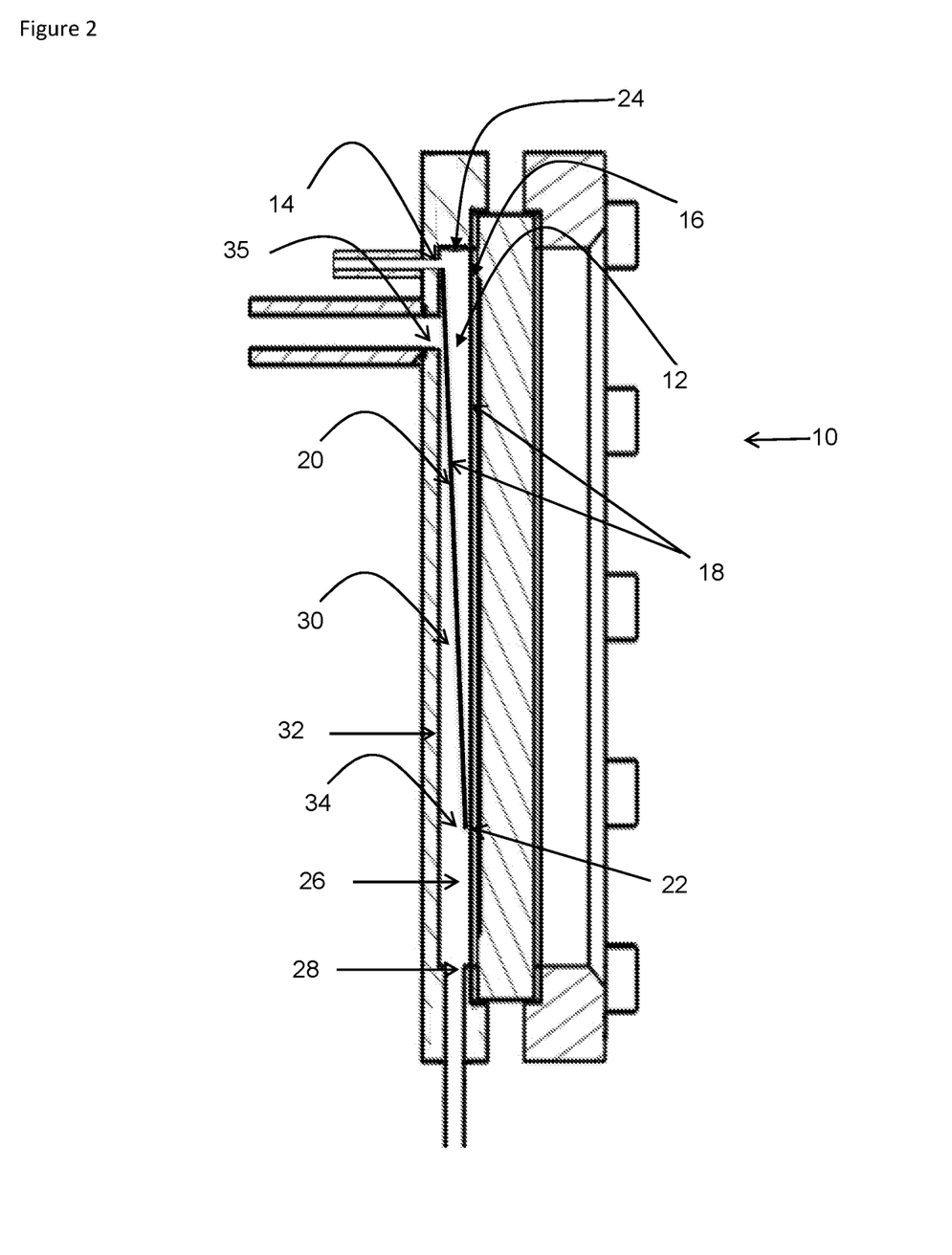
FIG. 2 shows a schematic longitudinal sectional view of a gas-liquid separator that can preferably be used.

FIG. 2 describes a preferably usable gas-liquid separator 10 in a longitudinal sectional view.

The gas-liquid separator 10 comprises a separating region 12 with an inlet nozzle 14, a baffle unit 16 and a gas-guiding unit 18. The gas-guiding unit 18 is formed by the baffle unit 16 of a gas acceleration plate 20 that is designed here as a baffle plate, and two further sidewalls not shown in the longitudinal section. Depicted, in particular is the present wedge-shaped form of the separating region 12, through which a gas is accelerated from the region of the inlet nozzle 14 towards the separation opening 22.

The baffle unit 16 that is configured here as a baffle plate can have a structured or smooth surface. The gas acceleration plate 20 can be flat from the direction of the inlet nozzle 14 in the direction of the separation opening 22 or can be curved slightly concavely, so that the apparent decrease in the distance between the baffle plate 16 and the gas acceleration plate 20 is reduced. The separating region 12 is delimited at the top by an upper end 24.

The gas-liquid separator 10 comprises a dividing region 26 with a liquid outlet 28, wherein the dividing region 26 is connected to the separating region 12 by means of the separation opening 22, so that the separating region 12 is in fluid communication with the dividing region 26.

In the present case, the baffle unit 16 designed as a baffle plate forms a sidewall of the dividing region 26. The bottom of the gas-liquid separator 10 is formed by the lower end of the dividing region 26. This bottom can be configured such that the liquid outlet 28 is provided at the deepest point of the bottom.

A sidewall 32 of the gas discharge region 30 and the two sidewalls, not shown in longitudinal section, together with an opening 34 that is provided between the gas discharge region 30 and the dividing region 26, and the separation opening 22, form the further boundaries of the dividing region.

In the dividing region 26, the gas phase is separated from the liquid phase, wherein the gas is preferably accelerated by the gas-guiding unit 18 in the direction of the separation opening 22, so that the liquid is transferred in the direction of the bottom of the dividing region 26.

The gas phase is guided into the gas discharge region 30 via the opening 34 that is provided between the gas discharge region 30 and the dividing region 26. The gas discharge region 30 in this case is configured such that the gas is accelerated in the direction of the gas outlet 35 that is provided in the gas discharge region 30.

In the present case, the rear wall of the gas acceleration plate 20 described earlier, together with the sidewall 32 protruding into the dividing region, forms a corresponding wedge shape, wherein an edge of the gas acceleration plate 20 is connected to the sidewall 32.

Figure 3:
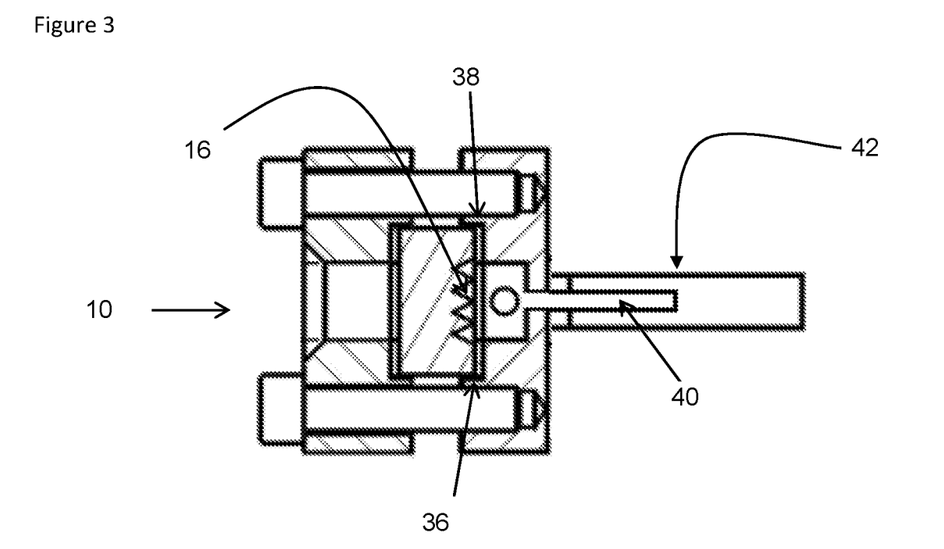
FIG. 3 shows a schematic cross-sectional illustration of a gas-liquid separator that can preferably be used.

FIG. 3 shows a schematic cross-sectional representation of a preferably usable gas-liquid separator 10, wherein the same reference symbols describe the same parts.

Apparent are particularly the initially not depicted sidewalls 36, 38 of the gas-liquid separator 10. Further, the feed line 40 of the aerosol and the discharge line for the gas 42 are depicted.

Further, it is apparent that in this embodiment, the baffle unit 16 designed as a baffle plate has a groove-shaped surface structure.

Figure 4:
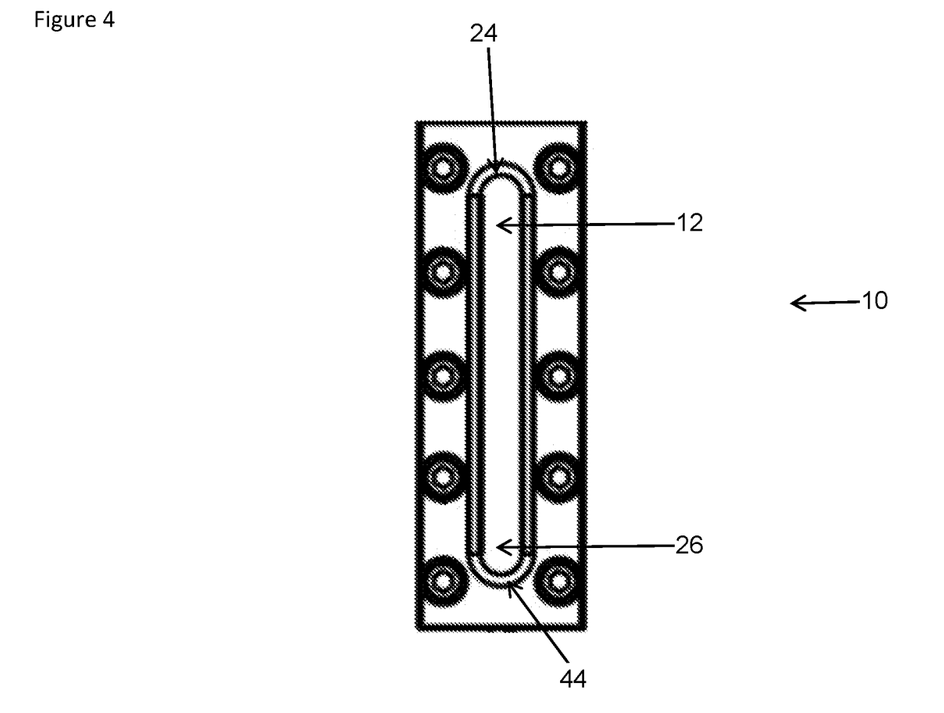
FIG. 4 shows a schematic top view of a gas-liquid separator that can preferably be used.

FIG. 4 shows a schematic plan view of a preferably usable gas-liquid separator 10, wherein the same reference symbols describe the same parts. Apparent is, in particular, the preferred configuration of the lower end 44 of the dividing region 26 and the upper end 24 of the separating region 12 that in the present case are each configured arc shaped.

The features of the invention disclosed in the preceding description, as well as in the claims, figures and exemplary embodiments, can be essential both individually and in any combination for realizing the invention in its various embodiments.

The invention claimed is:

1. A method of operating a fractionation collector for chromatography, comprising:
   pumping a solvent composition into a chromatography column, the solvent composition containing at least a first portion comprising a first solvent that is liquid under normal conditions and a second portion comprising a second solvent that is gaseous under normal conditions;
   at least partially introducing into a detector the solvent composition flowing out of said chromatography column;
   determining an amount of a composition containing said first solvent to be introduced into a collecting vessel of said fraction collector based on the first portion comprising said first solvent; and
   introducing the determined amount of the composition containing said first solvent, after leaving the chromatography column, into the collecting vessel of the fraction collector in dependence on a detector signal.

2. The method according to claim 1 wherein the solvent composition introduced into the chromatography column is changed in a course of the chromatography.

3. The method according to claim 1, wherein the first portion comprising the first solvent in the solvent composition is determined at a time of a beginning of the fraction collection, and a collection time for the collecting vessel is determined based on the first portion and a flow rate, wherein a volume of[the collecting vessel is stored in a control unit.

4. The method according to claim 1, wherein a degree of filling of the collecting vessel takes place via a summation of a volume that is introduced into said collecting vessel over a period of time, wherein individual volume components of a sum formation are determined using products of a flow rate, a period of time over which a respective volume component is collected, and the first portion comprising the first solvent in the solvent composition at a start time of the respective volume component, wherein a volume of the collecting vessel is stored in a control unit.

5. The method according to claim 2, wherein the second solvent that is contained in the solvent composition is at least partially separated off downstream of the chromatography column before the composition containing said first solvent is introduced into the fraction collector.

6. The method according to claim 1, wherein a gas-liquid separator is used and a pressure in the gas-liquid separator lies in a range from 0.1 bar to 4 bar.

7. A method according to claim 6, wherein fractionation is operated at a lower pressure than the gas-liquid separator.

8. The method according to claim 1, wherein the fraction collector is controlled by a controller and said controller is operatively connected to the detector, wherein after detection of a substance by the detector is finished, a control signal is sent to the fraction collector, which activates a change of the collecting vessel.

9. The method according to claim 3, wherein when determining a time of the beginning of the collection for introducing fractions to be collected, a liquid volume of lines and apparatuses is taken into account between the detector up to a point of segregation at which the fractions to be collected are separated from fractions to be discarded.

10. A chromatography system configured to perform the method according to claim 1, wherein the chromatography system comprises a controller that is operatively connected to the detector and the fraction collector and the controller is configured to determine the amount of the composition containing said first solvent to be introduced into the vessel of the fraction collector based on the first portion comprising the first solvent.

11. The chromatography system according to claim 10, wherein the fraction collector comprises collecting vessels that essentially have the same collection volume.

12. The chromatography system according to claim 10, wherein the collecting vessels of the fraction collector are configured as impact separators.

13. The chromatography system according to claim 10, wherein the chromatography system comprises a UV detector.

14. The chromatography system according to claim 10, wherein the chromatography system comprises a gas-liquid separator and a control valve is provided downstream of a gas outlet of the gas-liquid separator.

15. A conversion kit for converting a high-performance liquid chromatography system to the chromatography system according to claim 10, wherein the kit comprises at least one gas-liquid separator and at least one second control unit.

16. The method according to claim 3, wherein said solvent composition provided over a course of time is input in the control unit and said first portion comprising said first solvent is determined based on a start time of collection.

17. The method according to claim 6, wherein the pressure in the gas-liquid separator lies in a range from 0.5 bar to 3.5 bar (excess pressure).

18. A method according to claim 7, wherein a pressure difference lies in a range from 0.1 bar to 4 bar.

19. The chromatography system according to claim 12, wherein introduction of the fraction to be collected takes place at an angle in a range of 70° to 120°, relative to the vertical, against a wall of the collecting vessel.

20. The method according to claim 17, wherein the pressure in the gas-liquid separator lies in a range from 1 bar to 3 bar (excess pressure).

21. A method according to claim 18, wherein the pressure difference lies in a range from 0.5 bar to 3.5.

22. A method according to claim 18, wherein the pressure difference lies in a range from 1 bar to 3 bar.

* * * * *

UNITED STATES PATENT AND TRADEMARK OFFICE
CERTIFICATE OF CORRECTION

PATENT NO. : 11,402,359 B2
APPLICATION NO. : 16/644184
DATED : August 2, 2022
INVENTOR(S) : Alexander Bozic Page 1 of 1

It is certified that error appears in the above-identified patent and that said Letters Patent is hereby corrected as shown below:

In the Claims

At Column 25, Line 60, "dependence on" should be -- dependence of --.

At Column 25, Line 61, "claim 1" should be -- claim 1, --.

At Column 26, Line 2, "of[the" should be -- of the --.

At Column 27, Line 11, "3.5." should be -- 3.5 bar. --.

Signed and Sealed this
Twenty-fourth Day of September, 2024

Katherine Kelly Vidal
*Director of the United States Patent and Trademark Office*